United States Patent
Ejiri et al.

[11] 4,360,883
[45] Nov. 23, 1982

[54] METHOD OF RESTORING A PICTURE CELL BY ESTIMATION WITH HIGH DENSITY

[75] Inventors: Koichi Ejiri, Chiba; Morisumi Kurose, Yokohama; Seiji Hayakawa, Tokyo, all of Japan

[73] Assignee: Ricoh Co., Ltd., Tokyo, Japan

[21] Appl. No.: 175,697

[22] Filed: Aug. 6, 1980

Related U.S. Application Data

[63] Continuation of Ser. No. 20,055, Mar. 13, 1979, abandoned.

[30] Foreign Application Priority Data

Mar. 22, 1978 [JP] Japan ................................ 53-32767

[51] Int. Cl.³ .......................... H04N 5/14; H04N 1/40
[52] U.S. Cl. ........................................ 364/515; 355/7; 358/166; 358/284
[58] Field of Search ............... 364/515, 518, 520, 523, 364/526; 358/284, 166, 260; 340/723, 729, 750, 789, 793; 355/4, 5, 7

[56] References Cited

U.S. PATENT DOCUMENTS

| | | | |
|---|---|---|---|
| 2,962,550 | 11/1960 | Brink | 358/284 |
| 3,999,047 | 12/1976 | Green | 364/416 |
| 4,131,883 | 12/1978 | Lundstrom | 364/521 |
| 4,150,400 | 4/1979 | Wong | 358/260 |

OTHER PUBLICATIONS

Appel et al.; "Automatic Filling of Bounded Areas in a Raster Display"; IBM Tech. Discl. Bulletin; vol. 21, No. 3, Aug. 1978; pp. 1300-1303.
Stucki; "Optimal Digital Halftone Pattern Generation Method"; IBM Tech. Discl. Bulletin; vol. 17, No. 9, Feb. 1975; pp. 2779-2780.

*Primary Examiner*—Errol A. Krass
*Attorney, Agent, or Firm*—Oblon, Fisher, Spivak, McClelland & Maier

[57] ABSTRACT

Out of nine equal square picture cells forming a picture, only four picture cells surrounding the central picture cell which is to be restored by estimation are utilized. The central picture cell is divided into four equal square sub-cells. The densities of the sub-cells are determined from the mutual relations between the central picture cell and the four surrounding picture cells to determine the density of the central picture cell.

2 Claims, 4 Drawing Figures

METHOD OF RESTORING A PICTURE CELL BY ESTIMATION WITH HIGH DENSITY

This is a continuation, of application Ser. No. 020,055, filed on Mar. 13, 1979, now abandoned.

BACKGROUND OF THE INVENTION

This invention relates to a method of restoring a picture cell by estimation with high density in a copying machine.

FIG. 1 shows a picture consisting of nine equal square picture cells obtained by sampling a copying original.

Heretofore, in restoring the central picture cell X by estimation, the estimation is carried out by approximation over linear polynominals including the density data of the eight picture elements A, B, C, D, E, F, G and H surrounding the central picture cell X. The estimation coefficients of the picture cells B, D, E and G are about 0.5, and those of the picture cells A, C, F and H are about $-0.25$ for Japanese and European languages if they are of a sentence pattern. Therefore, in estimating the central picture element X, there is no substantially great difference in picture quality between the case where all of the picture cells A through H are utilized and the case where only four picture cells B, D, E and G are utilized. This is due to the mutual relations between the central picture cell X and the surrounding picture cells A through H. In other words, the estimation is greatly affected by the picture cells B, G, D and E which are positioned above, below, at the left-hand side and at the right-hand side of the central picture cell X, and is not so affected by the remaining picture cells A, C, F and H.

SUMMARY OF THE INVENTION

In view of the foregoing, an object of this invention is to provide a method of restoring a picture cell by estimation in which the number of picture cells utilized for the estimation is reduced, which contributes to simplification of the algorithm of restoring the picture cell by estimation.

Another object of the invention is to provide a method of restoring a picture cell by estimation by which the construction of a copying machine is simplified and the manufacturing cost thereof can be reduced.

The novel features which are considered characteristic of this invention are set forth in the appended claims. This invention itself, however, as well as other objects and advantages thereof will become more apparent from the following detailed description when read in conjunction with the accompanying drawings.

BRIEF DESCRIPTION OF THE DRAWINGS

In the accompanying drawings:

FIG. 1 is an explanatory diagram showing picture cells forming a picture sampled and for a description of a conventional method, which has been already referred to;

DETAILED DESCRIPTION OF THE INVENTION

Figure 1:
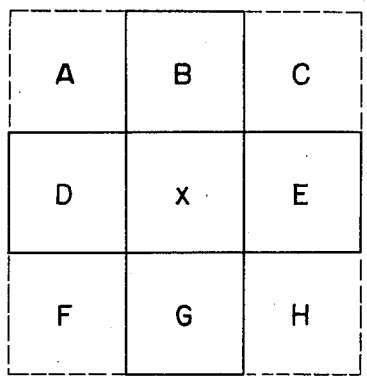
Figure 2:
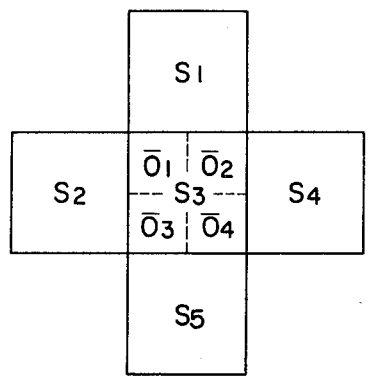
FIG. 2 is an explanatory diagram for a description of a method of restoring a picture cell by estimation according to the invention.

FIG. 2 shows five picture cells out of nine picture cells forming a picture, which are obtained by sampling a copying original. The five picture cells are utilized in a method of restoring a picture cell by estimation according to this invention. The picture cell to be restored is positioned at the center of the five cells and is designated by reference character $S_3$.

The picture cell $S_3$ is divided into four equal squares which are referred to as sub-cells $\bar{O}_1$, $\bar{O}_2$, $\bar{O}_3$ and $\bar{O}_4$, respectively. The output conditions of these sub-cells $\bar{O}_1$ through $\bar{O}_4$ are determined from the density data of the remaining picture cells $S_1$, $S_5$, $S_2$ and $S_4$ which are positioned above, below, on the left-hand side and on the right-hand side of the central picture cell $S_3$, respectively, to restore the central picture cell $S_3$ by estimation.

The algorithm in restoring the central picture cell by estimation is as follows:

(1) The following equations are calculated:

$$T_1 = S_1 + S_2 \quad (1)$$
$$T_2 = S_1 + S_4$$
$$T_3 = S_2 + S_5$$
$$T_4 = S_4 + S_5$$

where $S_1$, $S_2$, $S_4$ and $S_5$ are the densities of the respective picture cells, and each of the values $S_1$, $S_2$, $S_4$ and $S_5$ is one (1) when the respective picture cell is black, zero (0) when white, and a value between one and zero when grey.

(2) Then, the central picture cell $S_3$ is subjected to quinary quantization. If the resultant value is represented by $S_3{}^q$, then $S_3{}^q = 1/5, 2/5, 3/5, 4/5, 5/5$. The following determinations are effected:
When the quantized picture cell $S_3{}^q = 1/5$, $$\bar{O}_1 = \bar{O}_2 = \bar{O}_3 = \bar{O}_4 = 0 \text{ (white)} \quad (2)$$

When $S_3{}^q = 5/5$, $$\bar{O}_1 = \bar{O}_2 = \bar{O}_3 = \bar{O}_4 = 1 \text{ (black)} \quad (3)$$

(3) When $2/5 \leq S_3{}^q \leq 4/5$, the data $T_1$, $T_2$, $T_3$ and $T_4$ calculated as above are arranged in the order of magnitude, and the data thus arranged will be represented by $T_i$, $T_j$, $T_k$ and $T_l$, respectively.

(4) Then, with $\bar{O}_i{}^- = 1$ and $\bar{O}_j = \bar{O}_k = \bar{O}_l{}^- = 0$, 1/5 is subtracted from $S_3{}^q$.

(5) As a result of this subtraction, if $S_3{}^q$ is smaller than 1/5, then the algorithm is completed; and if $S_3{}^q$ is larger than 1/5, then the algorithm is advanced to the next step.

(6) With $\bar{O}_j{}^- = 1$, 1/5 is subtracted from $S_3{}^q$.

(7) As a result of this subtraction, if $S_3{}^q$ is smaller than 1/5, then the algorithm is completed; and if $S_3{}^q$ is larger than 1/5, then the algorithm is advanced to the next step.

(8) $\bar{O}_k = 1$ (9) Completion

Figure 3:
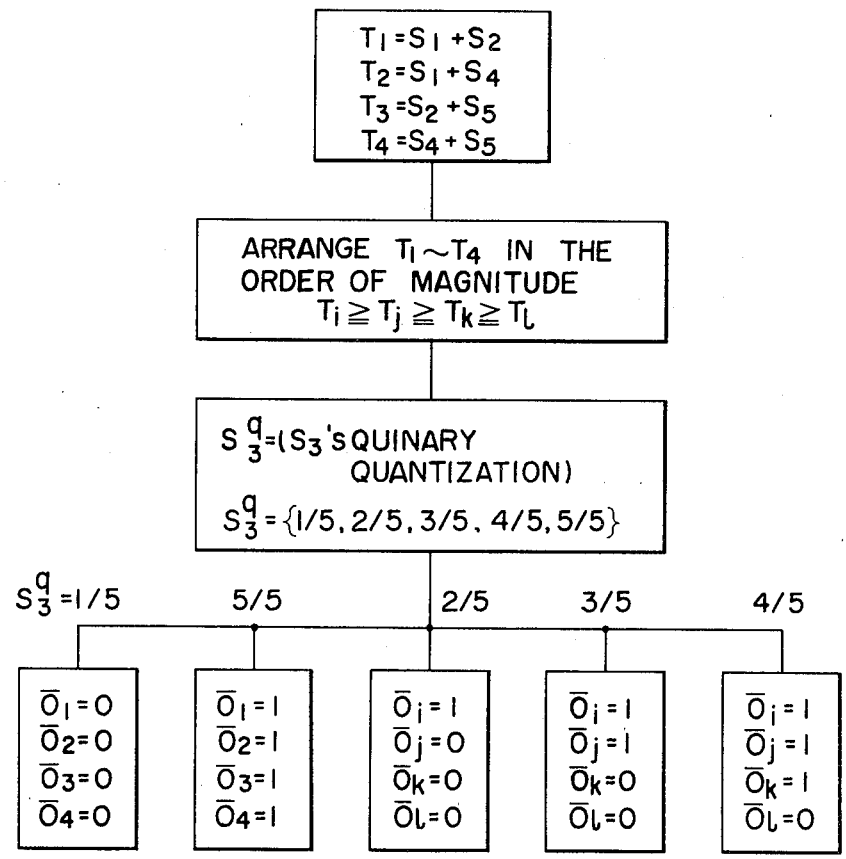
FIG. 3 is a flow chart showing algorithm according to the invention.

The flow of the above-described algorithms (1) through (9) is as indicated in FIG. 3. These algorithms are carried out for the entire surface of an original to be copied, but are not effected for the end portions of the original.

Figure 4:
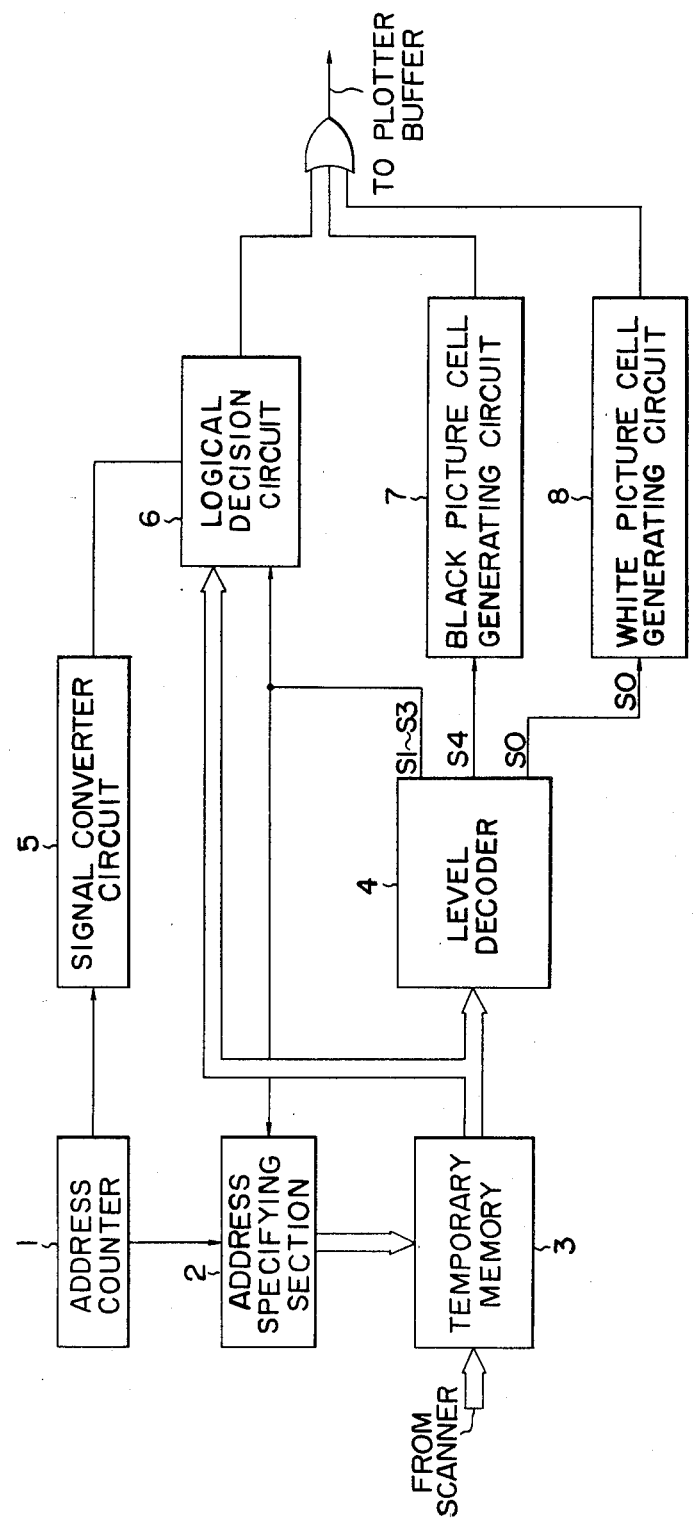
FIG. 4 is a block diagram showing a picture cell restoring device for realizing the flow shown in FIG. 3.

FIG. 4 is a block diagram showing a picture cell restoring device for realizing the flow indicated in FIG.

3. The picture cell restoring device comprises: an address counter 1 for counting the absolute address of the central picture cell $S_3$ (the provision of the address counter 1 being not always necessary); an address specifying section 2 operating to specify the addresses of the picture cells $S_1$ through $S_5$ according to data from the address counter 1; a memory 3 for temporarily storing data read out; a level decoder for deciding the density levels of the picture cells $S_1$ through $S_5$; an address counter signal converter circuit 5 which controls the algorithms described above according to data from the address counter 1 and suspends the logical decision at the end portions of an original to be copied; and a logical decision circuit 6 which is operated when the density level of the picture cell $S_3$ is 2/5, 3/5 or 4/5.

The picture cell restoring device further comprises: a black picture cell generating circuit 7; and a white picture cell generating circuit 8. When the density level of the picture cell $S_3$ is 1/5, the entire picture cell ($\bar{O}_1 - \bar{O}_4$) is estimated as white, and when 5/5, black.

As is apparent from the above description, according to the invention, it is unnecessary to use all of the eight picture cells to restore the central picture cell unlike the conventional method. That is, the aimed picture cell can be restored by estimation only with four picture cells above, below, right and, left readily when compared with the eight-picture-cell method. This will contribute to simplification of the copying machine and to reduction in the manufacturing cost thereof.

What is claimed is:

1. A method of restoring a picture cell by estimation which comprises the steps of:
    sampling a picture to obtain a plurality of equal size square picture cells as samples;
    selecting a picture cell to be restored;
    determining the optical density ($S_3$) of said picture cell to be restored;
    determining the optical densities of four picture cells which are adjacently positioned above, below, at the left side, and at the right side of the picture cell to be restored, said optical densities being represented by the values $S_1$, $S_5$, $S_2$ and $S_4$ respectively;
    dividing said picture cell to be restored into four equal sized square sub-cells, said four sub-cells being identified as upper left, upper right, lower left, and lower right;
    determining estimated optical densities $O_1$, $O_2$, $O_3$ and $O_4$ for said four sub-cells from mutual relationships between the optical density ($S_3$) of said picture cell to be restored and the optical densities ($S_1$, $S_5$, $S_2$ and $S_4$) of said four picture cells adjacently positioned about said picture cell to be restored, the optical density of said upper left sub-cell being represented by $O_1$, the density of said upper right sub-cell being represented by $O_2$, the density of said lower left sub-cell being represented by $O_3$, and the density of said lower right sub-cell being represented by $O_4$;
    outputting by means of a decoder a first control signal to generate a black picture cell when the value of each of said estimated optical densities is 1;
    outputting by means of said decoder a second control signal to generate a white picture cell when the value of each of said estimated optical densities is 0; and
    outputting by means of said decoder a third control signal to generate at least one black sub-cell which has an estimated optical density of 1 and to generate white sub-cells for the remainder of said sub-cells which remainder of said sub-cells have an estimated optical density of 0.

2. A method of restoring a picture cell by estimation as recited in claim 1 wherein said step of determining the estimated optical densities for said four sub-cells comprises the steps for:
    quantizing the optical density ($S_3$) of said picture cell to be restored into one of five levels (quinary quantization) such that said quantized value ($S^{q_3}$) is represented as one of the numbers 1/5, 2/5, 2/5, 4/5 and 5/5;
    analyzing the results of said quantization as follows:
        when $S^{q_3} = 1/5$, then $O_1 = O_2 = O_3 = O_4 = 0$, and
        when $S^{q_3} = 5/5$, then $O_1 = O_2 = O_3 = O_4 = 1$
    wherein 0 represents white and 1 represents black;
    further analyzing the results of said quantization for the condition $S/5 < S^{q_3} < 4/5$ as follows:
        when $S^{q_3} = 2/5$, then $O_i = 1$ and $O_j = O_k = O_l = 0$
        when $S^{q_3} = 3/5$, then $O_i = O_j = 1$ and $O_k = O_l =$
        when $S^{q_3} = 4/5$, then $O_i = O_j = O_k = 1$ and $O_l = 0$
    wherein $O_i$, $O_j$, $O_k$, $O_l$ represent unassigned sub-cell optical densities;
    calculating four summed optical densities ($T_1$, $T_2$, $T_3$, $T_4$) from said optical density values $S_1$, $S_5$, $S_4$ and $S_2$ such that:

$T_1 = S_1 + S_2$ $T_2 = S_1 + S_4$ $T_3 = S_2 + S_5$ $T_4 = S_4 + S_5$ arranging said four summed optical densities $T_1$, $T_2$, $T_3$ and $T_4$ in the order of their magnitudes and relabeling said summed optical densities as $T_i$, $T_j$, $T_k$ and $T_l$ respectively, such that $T_i > T_j > T_k > T_l$;
    relating $T_i$, $T_j$, $T_k$ and $T_l$ to the ordered optical densities $T_1$, $T_2$, $T_3$, $T_4$ such that the subscripts i, j, k, l are identified as each being one of the numbers 1, 2, 3, 4; and
    determining the estimated optical densities for the sub-cells $O_1$, $O_2$, $O_3$ and $O_4$ by assigning the values $O_i$, $O_j$, $O_l$ to the sub-cells $O_1$, $O_2$, $O_3$, $O_4$ based upon the above determined identities of i, j, k, l.

* * * * *